United States Patent [19]

Ishizaka et al.

[11] 4,283,133
[45] Aug. 11, 1981

[54] LARGE APERTURE RATIO INTERCHANGEABLE LENS FOR A SINGLE LENS REFLEX CAMERA

[75] Inventors: Sunao Ishizaka, Tokyo; Toru Fukuhara, Isehara, both of Japan

[73] Assignee: Nippon Kogaku K.K., Tokyo, Japan

[21] Appl. No.: 74,485

[22] Filed: Sep. 11, 1979

[30] Foreign Application Priority Data

Sep. 19, 1978 [JP] Japan .................... 53-127515[U]

[51] Int. Cl.³ .............................................. G03B 9/02
[52] U.S. Cl. ...................................... 354/270; 354/46
[58] Field of Search .................... 354/46, 270–274, 354/286

[56] References Cited

U.S. PATENT DOCUMENTS

| | | |
|---|---|---|
| 3,683,765 | 8/1972 | Iura . |
| 3,896,462 | 7/1975 | Taguchi et al. ................... 354/46 |
| 4,118,726 | 10/1978 | Kuramoto et al. ............. 354/273 X |

Primary Examiner—John Gonzales
Attorney, Agent, or Firm—Shapiro and Shapiro

[57] ABSTRACT

A large aperture ratio interchangeable lens for a single lens reflex camera comprises a lens body, a preset aperture ring provided for rotation with respect to the lens body, a first signal member operatively associated with the preset aperture ring to transmit a corrected difference signal ($f - f_O - \Delta f$) to the camera body, and a second signal member for transmitting a corrected open value signal ($f_O + \Delta f$) to the camera body.

4 Claims, 4 Drawing Figures

LARGE APERTURE RATIO INTERCHANGEABLE LENS FOR A SINGLE LENS REFLEX CAMERA

BACKGROUND OF THE INVENTION

1. Field of the Invention

This invention relates to an interchangeable lens for a single lens reflex camera, and more particularly to a large aperture ratio interchangeable lens for use with a single lens reflex camera of the TTL open photometry type.

2. Description of the Prior Art

An interchangeable lens for use with a single lens reflex camera of the TTL open photometry type is known in which a first signal member for transmitting to the camera body a difference signal $(f-f_O)$ corresponding to the number of stages by which a preset aperture value (f) is stopped down with respect to an open F-value $(f_O)$ is provided on a preset aperture ring formed with equidistant aperture divisions, and in which a second signal member for transmitting the open F-value $(f_O)$ inherent to the lens to the camera body is fixed onto the lens body.

The construction for such signal transmission is basically directed to lenses in which the relation between the number of stop-down stages of the aperture diaphragm and the quantity of light passed through the lens exhibits the linearity as shown in FIG. 1 of the accompanying drawings (usually, dark lenses having open F-values of 2 or greater). However, in bright lenses having open F-values of 1.2, 1.4 and so on, the quantity of light reaching the surface of a light-receiving element and the surface of a film in the vicinity of a fully opened aperture is decreased below the theoretical value due to vignetting or the like, as shown in FIG. 2 of the accompanying drawings. For this reason, in these bright lenses, the first signal member is installed with a deviation of $\Delta f$ corresponding to the decrease in the quantity of light received from the theoretical quantity so as to produce a signal $(f-f_O-\Delta f)$ as a corrected difference signal representing the number of aperture stages, i.e., stops, from the open F-value to the preset aperture value (f), and thereby prevent occurrence of a metering error.

If the preset aperture value is displayed within the finder or transmitted to a speed light, i.e., an electronic flash, through the camera body by the use of a difference signal $(f-f_O)$ and an open value signal $(f_O)$ obtained from the first and second signal members, respectively, then it is possible in the dark lenses to obtain an accurate preset aperture value f by combining the difference signal $(f-f_O)$ and the open value signal $(f_O)$. In the bright lenses, however, the first signal member produces a corrected difference signal $(f-f_O-\Delta f)$ and it is therefore impossible to obtain an accurate preset aperture value by simply synthesizing the open value signal $(f_O)$.

SUMMARY OF THE INVENTION

The object of the present invention is to provide a large aperture ratio interchangeable lens for a single lens reflex camera in which an accurate preset aperture value can be transmitted to the camera body side.

Such object of the present invention is achieved by providing a second signal member for producing a corrected open value signal $(f_O+\Delta f)$, in addition to a first signal member for producing a corrected difference signal $(f-f_O-\Delta f)$.

The invention will become fully apparent from the following detailed description thereof taken in conjunction with the accompanying drawings.

DESCRIPTION OF THE PREFERRED EMBODIMENTS

Figure 1:
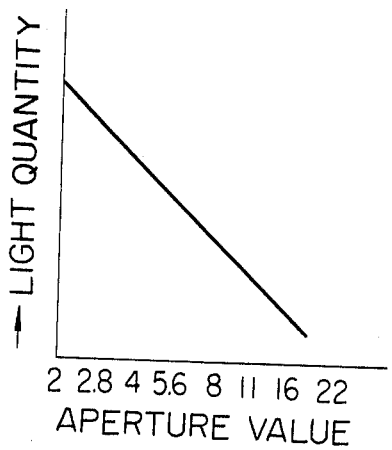
FIG. 1 is a graph illustrating the relation between the number of stop-down stages of the aperture of a dark lens having an open F-value of 2 or greater and the quantity of light passed through such lens.
Figure 2:
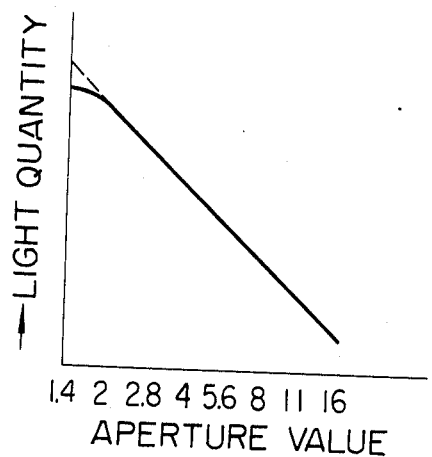
FIG. 2 is a graph illustrating the relation between the number of stop-down stages of a bright lens having an open F-value of 1.2, 1.4 or so and the quantity of light passed through such lens.
Figure 3:
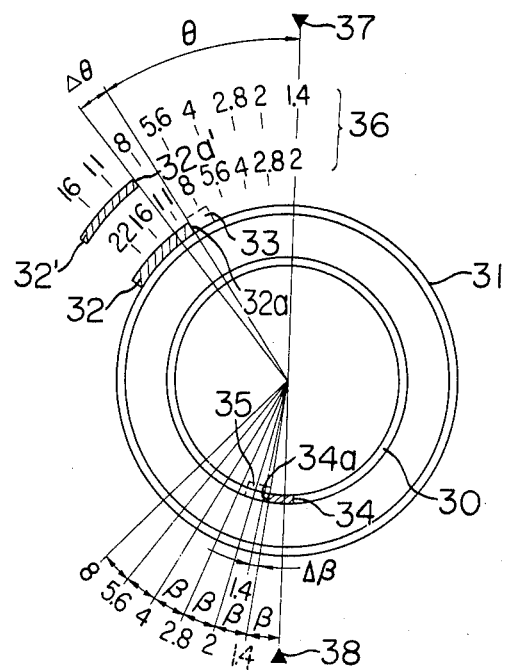
FIG. 3 illustrates the positional relation between first and second signal members in the interchangeable lens of the present invention.

The invention will hereinafter be described and contrasted with the prior art by reference to the drawings. FIG. 3 illustrates the positional relationship between first and second signal members in the interchangealbe lens of the present invention (typically, an interchangeable lens having open F-values of 1.4 and 2). The prior art will first be described. In FIG. 3, a first signal member 32 is provided on a preset aperture ring 31. A first transmitted member 33 on the camera body side is biased counterclockwise and when an interchangeable lens is mounted on the camera body by clockwise rotation thereof, the first transmitted member is engaged by the engaging end 32a of the first signal member 32, which maintains an operative association therewith so that the first transmitted member is rotated when the preset aperture ring is rotated. A resistance brush (not shown) is operatively associated with the first transmitted member 33 and the resistance value thereof is linearly varied in accordance with the rotation of the preset aperture ring to a desired aperture value to produce a difference signal having a magnitude of $(f-f_O)$.

A second signal member 34 is provided on the body 30 of the interchangeable lens, for example, on a protecting member secured to the inner periphery of a lens mount and projected beyond the surface of a rearward lens element. A second transmitted member 35 on the camera body side, biased counter clockwise, is engaged by the engaging end 34a of a second signal member 34 and rotated clockwise with the clockwise rotation of the interchangeable lens during mounting of the same on the camera body, which displaces the second transmitted member to a predetermined position when the mounting operation is completed. A resistance brush (not shown) for producing an open value signal $(f_O)$ is operatively associated with the seccnd transmitted member 35 and the resistance value thereof is linearly varied in accordance with the clockwise rotation of the lens during mounting.

The engaging end 32a of the first signal member 32 of the interchangeable lens having an open F-value of 2 is spaced apart by a predetermined angle $\theta$ from a fixed index mark 37 on the lens body when a division f:2 (representing the open F-value) of aperture value divisions 36 equidistantly provided on the aperture ring is registered with the fixed index mark 37 as the first standard position on the lens body after completion of the mounting of the interchangeable lens. The dark interchangeable lens having an open F-value of 2 or greater is designed such that this angle $\theta$ is always maintained when the aperture division representing the open F-value has been registered with the fixed index mark after the mounting of the lens onto the camera body.

In contrast, the engaging end $32a'$ of a first signal member $32'$ of an interchangeable lens having an open F-value of 1.4 is provided so that it is spaced apart by an angle $(\theta + \Delta\theta)$ from the fixed index mark 37 as the first standard position. That is, in the case of an interchangeable lens having a theoretical open F-value of 1.4, if the substantial open F-value is only of the order of 1.7, a correction is made as if the metering were being effected by a lens having an open F-value of 1.7.

On the other hand, the second signal member 34 for transmitting to the camera body the theoretically determined open F-value inherent to each interchangeable lens body is adapted to be spaced apart from a second standard position (index mark), after completion of the mounting of the lens 38 by an angle resulting from multiplying an angle $\beta$ corresponding to one stage of the open F-value by the number of stages of the open F-value inherent to the interchangeable lens. According to the construction of the present invention, in a large aperture ratio interchangeable lens having an open F-value of 1.4, the second signal member 34 is provided with a further deviation of $\Delta\beta$ in addition to the angle $\beta$.

Figure 4:
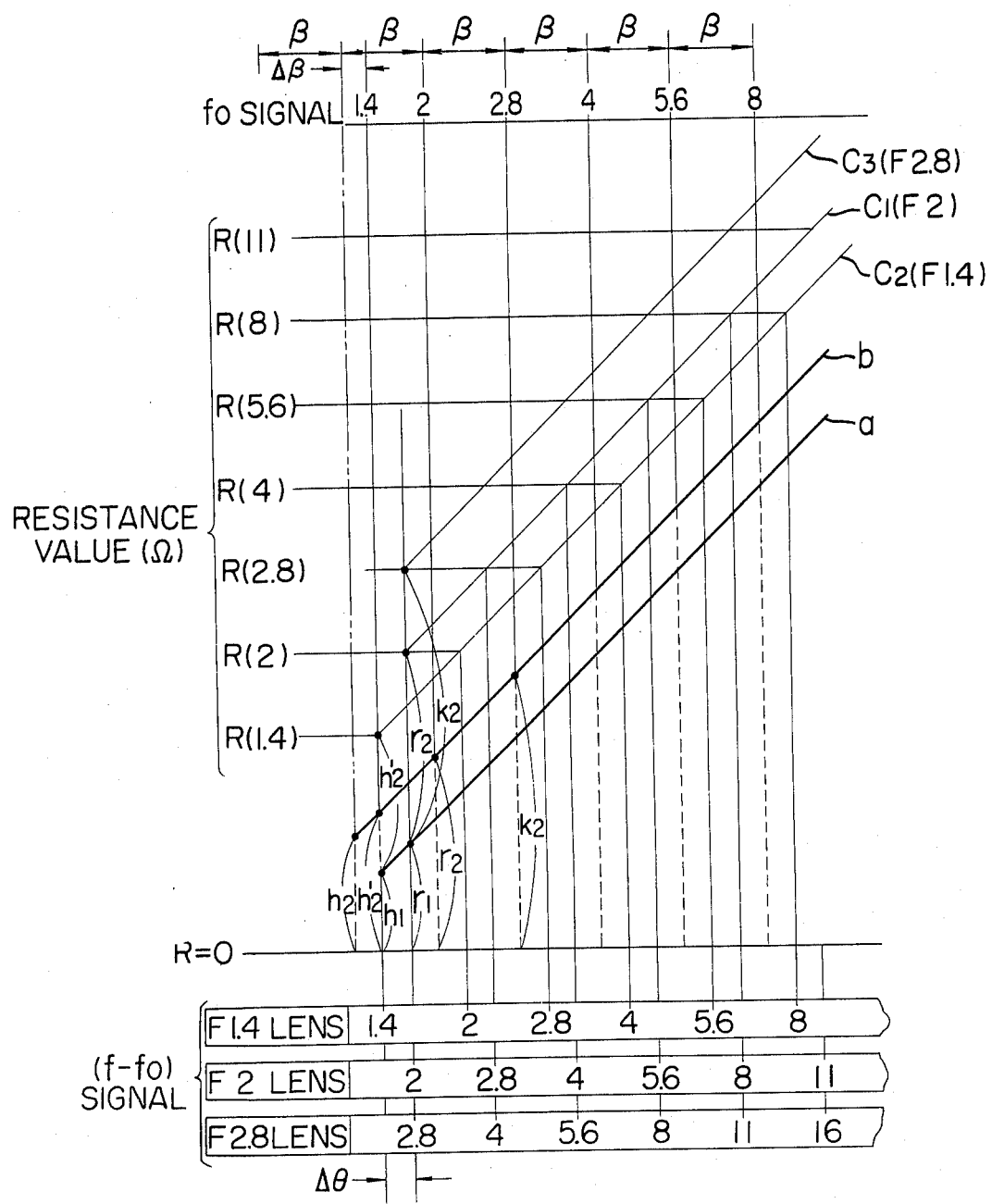
FIG. 4 illustrates the displacements of first and second transmitted members substituted for by variations in resistance values for the difference signal $(f-f_O)$ and the open value signal $(f_O)$.

Reference is now had to FIG. 4 to describe the operation of the present invention by substituting the displacement of the first and second transmitted members 33 and 35 by the variation in resistance values for the difference signal $(f-f_O)$ and for the open F value signal $(f_O)$.

FIG. 4 shows, in overlapped relationship, the displacement of the difference signal $(f-f_O)$ by the first signal member and the displacement of the open value signal $(f_O)$ by the second signal member. The ordinate represents the resistance value, showing the standard by a straight line $R = O$. The abscissa represents the aperture value, and the lower portion of FIG. 4 shows the displacement of the difference signal $(f-f_O)$ by the first signal member with respect to interchangeable lenses having open F-values of 1.4, 2 and 2.8, respectively, while the upper portion of FIG. 4 shows the displacement of the open value signal $(f_O)$ by the second signal member. A straight line a in FIG. 4 indicates the variation in resistance value corresponding to the difference signal $(f-f_O)$ and a straight line b indicates the variation in resistance value corresponding to the open value signal $(f_O)$. Resistance values R(1.4), R(2) and so on, corresponding to the preset aperture values 1.4, 2 and so on, are predetermined proportionally varying values. By the combined value of the resistance for the difference signal $(f-f_O)$ and the resistance for the open value signal $(f_O)$ the preset aperture value corresponding to this combined resistance value is represented.

Description will first be made of an interchangeable lens having an open F-value of 2. When the aperture division f:2 is registered to the fixed index mark 37 as the first standard position, the first transmitted member 33 is displaced in response to the first signal transmitting member 32 and the value of the resistance corresponding to the difference signal $(f-f_O)$ exhibits the value of $\gamma_1$ on the straight line a in FIG. 4. On the other hand, due to the displacement of the second transmitted member 35 in response to the second signal member 34 during the lens mounting, the value of the resistance for the open value signal $(f_O)$ exhibits the value of $\gamma_2$ on the straight line b because the open F-value is 2. The sum $(\gamma_1 + \gamma_2)$ of these resistance value represents a resistance value R(2) corresponding to the preset aperture value f:2. The resistance value corresponding to the preset aperture value varies along a straight line $c_1$ which represent the straight line a plus the resistance value $\gamma_2$ of the open value signal $f_O$.

A large aperture ratio interchangeable lens having an open F-value of 1.4 will now be described. When the aperture division f:1.4 is registered to the fixed index mark 37, the resistance for the difference signal $(f-f_O)$ exhibits the value $h_1$ on the straight line a because the first signal member 32 is deviated by an angle $\Delta\theta$. The resistance for the open value signal $f_O$ exhibits the value $h_2$ on the straight line b when the second signal member 34 is only deviated by an angle $\beta$ from the second standard position 38. As can be seen, this resistance value $(h_1 + h_2)$ is less than the resistance value R(1.4) representing the preset aperture value f:1.4. This is because the value of the resistance for the difference signal $(f-f_O)$ is reduced by $(\gamma_1 - h_1)$ corresponding to the angle $\Delta\theta$.

Therefore, according to the present invention, the position of the engaging end 34a of the second signal member 34 is deviated clockwise by $\Delta\beta$ from the standard position 38 and the resistance value corresponding to $(\gamma_1 - H_1)$ has been added to the resistance for the open value signal $f_O$. By doing so, the value of the resistance for the open value signal $(f_O)$ becomes $h_2'$ and $(h_1 + h_2') = R(1.4)$.

Accordingly, the resistance value $h_2'$ for the open value signal $(f_O)$ is invariable as long as an interchangeable lens is mounted on the camera body and therefore, when an aperture value is arbitrarily selected by rotating the preset aperture ring 31, the resistance for the difference signal $(f-f_O)$ is varied along the straight line a and the preset aperture resistance is varied along a straight line $c_2$ which is the straight line a plus $h_2$, thus it is possible to obtain an accurate preset aperture value. That is, by combining the corrected open value signal $(f_O + \Delta f)$ transmitted by the second signal member 34 with the corrected difference signal $(f - f_O - \Delta f)$ transmitted by the first signal member $32'$, $(f - f_O - \Delta f) + (f_O + \Delta f) = f$ is achieved.

Incidentally, in the case of an interchangeable lens having an open F-value of 2.8, the situation is substantially similar to that in the case of the above-described interchangeable lens having an open F-value of 2, but since the resistance for the open value signal $(f_O)$ by the second signal member 34 exhibits the value $k_2$ on the straight line b, the resistance value corresponding to the preset aperture value is varied along a straight line $c_3$ which is the straight line a plus $k_2$.

Although the construction has been made such that the resistance values vary following each signal member, it is also possible to employ a mechanical combined signal or an electrical digital signal.

According to the present invention as described above, even in bright lenses having F-values of 1.2, 1.4, etc., an accurate preset aperture value can be transmitted to the camera body or to the speed light, which is effective for the display of the correct preset aperture value or for the control of the guide number in the speed light.

We claim:

1. A large aperture ratio interchangeable lens adapted to be mounted on the camera body of a single lens reflex camera of the TTL open photometry type comprising a lens body, a preset aperture ring rotatable with respect to the lens body for varying the lens aperture between an open F-value ($f_O$) inherent to said lens and a desired F-value (f) by rotation of the aperture ring, a first signal member operatively associated with the aperture ring for transmitting to the camera body, by virtue of the location of the first signal member, a difference signal ($f - f_O$) corresponding to the difference between the open F-value ($f_O$) and the desired F-value (f) set by said aperture ring, the first signal member having a deviation from a predetermined position at which the position of the first signal member corresponds to the open F-value ($f_O$) inherent to said lens in order to compensate for the difference between the quantity of light theoretically passing through said lens and the quantity of light actually passing through the lens, and a second signal member for transmitting to the camera body, by virtue of the location of the second signal member, a signal corresponding to said open F-value ($f_O$), the second signal member having a deviation from a predetermined position at which the position of the second signal member indicates the open F-value ($f_O$) of the lens, said deviation of the second signal member being equal to the deviation of the first signal member.

2. An interchangeable lens according to claim 1, wherein said second signal member transmits said open F-value ($f_O$) to said camera body by the angular position of the second signal member with respect to the camera body.

3. An interchangeable lens according to claim 1, wherein said lens body further has a lens protecting member projected beyond the rearmost lens surface, and said second signal member is provided on said protecting member.

4. An interchangeable lens according to claim 1, wherein the first signal member is rotatable with the preset aperture ring and said difference signal ($f - f_O$) corresponds to the angular position of the first signal member, and wherein said deviation of the first signal member is an angular deviation corresponding to a difference in F-value of $\Delta f$.

* * * * *